United States Patent
Chen (10) Patent No.: US 11,516,772 B2
(45) Date of Patent: Nov. 29, 2022

(54) PAGING METHOD, TERMINAL AND NETWORK-SIDE DEVICE

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/652,146

(22) PCT Filed: Sep. 6, 2018

(86) PCT No.: PCT/CN2018/104291
§ 371 (c)(1),
(2) Date: Mar. 30, 2020

(87) PCT Pub. No.: WO2019/062509
PCT Pub. Date: Apr. 4, 2019

(65) Prior Publication Data
US 2020/0252906 A1    Aug. 6, 2020

(30) Foreign Application Priority Data

Sep. 30, 2017  (CN) .......................... 201710920159.9

(51) Int. Cl.
*H04W 68/02* (2009.01)
*H04W 76/11* (2018.01)
(Continued)

(52) U.S. Cl.
CPC ......... *H04W 68/025* (2013.01); *H04W 16/28* (2013.01); *H04W 24/08* (2013.01);
(Continued)

(58) Field of Classification Search
CPC ... H04W 68/025; H04W 76/11; H04W 16/28; H04W 24/08; H04W 56/001;
(Continued)

(56) References Cited

U.S. PATENT DOCUMENTS

2012/0178485 A1    7/2012  Zeira et al.
2014/0323165 A1*  10/2014  Diachi .................. H04W 68/02
                                                                    455/458
(Continued)

FOREIGN PATENT DOCUMENTS

CN    101309435 A      11/2008
CN    107018497 A   *  8/2017
(Continued)

OTHER PUBLICATIONS

Extended European Search Report dated May 14, 2020, issued in PCT/CN2018/104291.
(Continued)

*Primary Examiner* — Said M Elnoubi
(74) *Attorney, Agent, or Firm* — Brooks Kushman P.C.

(57) ABSTRACT

A paging method, a terminal, and a network-side device are provided. The paging method includes: receiving pre-indication information transmitted by a network-side device; transmitting an uplink signal to the network-side device in a case that the pre-indication information indicates that the terminal is to be paged; and monitoring a paging of the terminal by the network-side device.

20 Claims, 2 Drawing Sheets

(51) Int. Cl.
  *H04W 16/28*  (2009.01)
  *H04W 24/08*  (2009.01)
  *H04W 56/00*  (2009.01)
  *H04W 68/00*  (2009.01)

(52) U.S. Cl.
  CPC ....... *H04W 56/001* (2013.01); *H04W 68/005* (2013.01); *H04W 76/11* (2018.02)

(58) Field of Classification Search
  CPC ..... H04W 68/005; H04W 4/08; H04W 68/02; H04L 5/00; H04L 5/0053
  See application file for complete search history.

(56) References Cited

U.S. PATENT DOCUMENTS

2019/0182784 A1* 6/2019 Harada ................ H04W 16/28
2021/0014823 A1* 1/2021 Takeda ................ H04L 5/0085

FOREIGN PATENT DOCUMENTS

| | | |
|---|---|---|
| CN | 107018497 A | 8/2017 |
| EP | 2453710 A1 | 6/2012 |
| WO | 2009043297 A1 | 4/2009 |
| WO | 2018171449 A1 | 9/2018 |

OTHER PUBLICATIONS

International Search Report and Written Opinion dated Apr. 9, 2020, issued in PCT/CN2018/104291.
3GPP TSG-RAN WG1 Meeting #83 R1-157385, Remaining issues for random access transmission, Nov. 22, 2015.

* cited by examiner

PAGING METHOD, TERMINAL AND NETWORK-SIDE DEVICE

This application is the U.S. national phase of PCT Application No. PCT/CN2018/104291 filed on Sep. 6, 2018, which claims a priority to Chinese Patent Application No. 201710920159.9 filed on Sep. 30, 2017, both disclosures of which are incorporated in their entireties by reference herein.

CROSS-REFERENCE TO RELATED APPLICATION

This application claims a priority to Chinese Patent Application No. 201710920159.9 filed on Sep. 30, 2017, the disclosure of which is incorporated in its entirety by reference herein.

TECHNICAL FIELD

The present disclosure relates to the technical field of communications, and in particular to a paging method, a terminal and a network-side device.

BACKGROUND

In a Long Term Evolution (LTE) system in related art, in a case that a network side is going to perform data transmission with a user equipment (UE) in an idle mode, a network-side device needs to notify the UE via paging. In this case, the UE shall monitor a paging message to complete subsequent responses. However, if the UE in an idle mode keeps monitoring a paging message, it may waste a great deal of power of the UE. Therefore, in order to save power consumption of the UE, a Discontinuous Reception (DRX) period is introduced in the LTE system. The UE monitors a physical downlink control channel (PDCCH) only at a position corresponding to a paging frame (PF) and a paging occasion (PO) calculated according to UE_ID, thereby receiving a paging message on a resource indicated by PDCCH information.

Since a network side does not know a specific location of a UE in an idle mode, the network side may transmit a paging message to the UE through all base stations in a tracking area (TA), when the UE needs to be paged, which causes a waste of network resources.

SUMMARY

In a first aspect, a paging method is provided according to an embodiment of the present disclosure, which is applied to a terminal. The method includes:
receiving pre-indication information transmitted by a network-side device;
transmitting an uplink signal to the network-side device in a case that the pre-indication information indicates that the terminal is to be paged; and
monitoring a paging of the terminal by the network-side device.

In a second aspect, a paging method is provided according to an embodiment of the present disclosure, which is applied to a network-side device. The method includes:
transmitting pre-indication information to terminals;
receiving an uplink signal transmitted by a terminal, where the terminal is at least one of a to-be-paged terminal indicated by the pre-indication information, or a terminal in a terminal group indicated by the pre-indication information; and
paging the terminal.

In a third aspect, a terminal is further provided according to an embodiment of the present disclosure, which includes:
a first reception module, configured to receive pre-indication information transmitted by a network-side device;
a first transmission module, configured to transmit an uplink signal to the network-side device in a case that the pre-indication information indicates that the terminal is to be paged; and
a monitoring module, configured to monitor a paging of the terminal by the network-side device.

In a fourth aspect, a network-side device is further provided according to an embodiment of the present disclosure, which includes:
a second transmission module, configured to transmit pre-indication information to terminals;
a second reception module, configured to receive an uplink signal transmitted by a terminal, where the terminal is at least one of a to-be-paged terminal indicated by the pre-indication information, or a terminal in a terminal group indicated by the pre-indication information; and
a paging module, configured to page the terminal.

In a fifth aspect, a terminal is further provided according to an embodiment of the present disclosure, which includes a processor, a memory and a computer program that is stored on the memory and is executable on the processor. When executing the computer program, the processor is configured to perform steps of the paging method applied to the terminal.

In a sixth aspect, a network-side device is further provided according to an embodiment of the present disclosure, which includes a processor, a memory and a computer program that is stored on the memory and is executable on the processor. When executing the computer program, the processor is configured to perform steps of the paging method applied to the network-side device.

In a seventh aspect, a computer-readable storage medium is further provided according to an embodiment of the present disclosure, on which a computer program is stored. The computer program, when being executed by a processor, configures the processor to perform steps of the paging method applied to the terminal.

In an eighth aspect, a computer-readable storage medium is further provided according to an embodiment of the present disclosure, on which a computer program is stored. The computer program, when being executed by a processor, configures the processor to perform steps of the paging method applied to the network-side device.

BRIEF DESCRIPTION OF THE DRAWINGS

In order to explain technical solutions of embodiments of the present disclosure more clearly, drawings used in the embodiments of the present disclosure will be briefly illustrated below. Obviously, the drawings in the following description are only some embodiments of the present disclosure. Based on these drawings, those skilled in the art can also obtain other drawings without paying creative effort.

DETAILED DESCRIPTION

In order to explain technical solutions of embodiments of the present disclosure more clearly, drawings used in the embodiments of the present disclosure will be briefly illustrated below. Obviously, the drawings in the following description are only some embodiments of the present disclosure. Based on these drawings, those skilled in the art can also obtain other drawings without paying creative effort.

Figure 1:
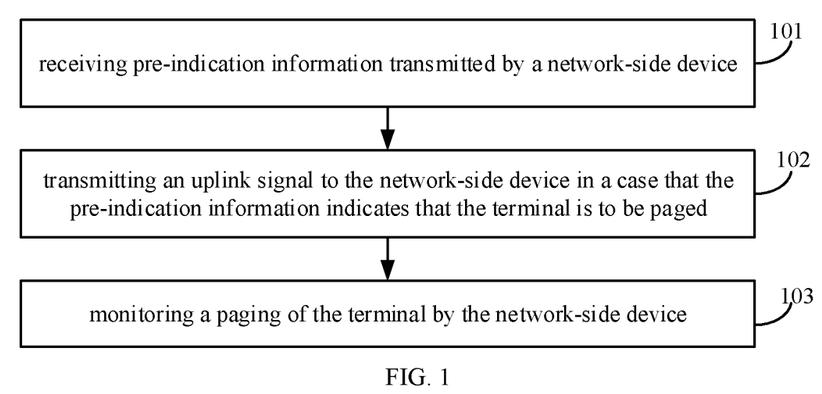
FIG. 1 is a flowchart of a paging method according to an embodiment of the present disclosure.

Reference is made to FIG. 1, and an embodiment of the present disclosure provides a paging method, which is applied to a terminal and includes the following steps.

Step 101 includes: receiving pre-indication information transmitted by a network-side device.

The pre-indication information is transmitted by the network-side device in advance before initiating a paging, which is used to indicate a terminal and/or a terminal group to be paged. When the pre-indication information indicates a certain terminal and/or a certain terminal group that is to be paged, an identifier (ID) of the terminal and/or an ID of the terminal group may be carried in the pre-indication information. That is, in a case that the pre-indication information carries an ID of a certain terminal and/or an ID of a certain terminal group, the pre-indication information indicates that the certain terminal and/or the certain terminal group is to be paged.

Specifically, the pre-indication information may be at least one of the following information: paging indication information, prior indication information, a wake-up signaling, a go-to-sleep signaling, or the like.

Step 102 includes: transmitting an uplink signal to the network-side device in a case that the pre-indication information indicates that the terminal is to be paged.

The uplink signal transmitted by the terminal is a response to the received pre-indication information. That is, in a case that a to-be-paged terminal and/or a to-be-paged terminal group indicated by the pre-indication information includes a terminal that has received the pre-indication information, the terminal that has received the pre-indication information may transmit an uplink signal to the network-side device. For example, if pre-indication information A transmitted by a base station indicates that terminal 1, terminal 2, terminal 3, and terminal 4 are to be paged, terminal 2 transmits an uplink signal to the base station when receiving pre-indication information A, as pre-indication information A indicates that terminal 2 is to be paged; while terminal 5 may not transmit an uplink signal to the base station when receiving pre-indication information A. Alternatively, if pre-indication information A also indicates that terminal group 1 and terminal group 2 (including terminal 5) are to be paged, terminal 5 may transmit an uplink signal to the base station when receiving pre-indication information A, as pre-indication information A indicates that terminal 5 is to be paged.

In an embodiment of the present disclosure, the uplink signal may be at least one of the following signals: a sequence signal, a predefined indication signal, an uplink reference signal, an uplink signal carried in a physical uplink control channel (PUCCH), or an uplink signal carried in a physical uplink sharing channel (PUSCH).

The sequence signal may be a preamble sequence signal or a newly designed sequence signal. The uplink reference signal may be an uplink reference signal in related art. The uplink signal carried in PUCCH or PUSCH may be transmitted, for example, through an Msg3 message or a request message for radio resource control (RRC) connection.

Further, in a case that the uplink signal is a preamble sequence signal, the network-side device may configure a dedicated preamble sequence for the terminal through system information and/or a dedicated RRC signaling, before transmitting an uplink signal. It should be noted that the network side may configure the preamble sequence for the terminal before transmitting the pre-indication information, or may configure the preamble sequence after transmitting the pre-indication information and before the terminal transmits the uplink signal, or may also configure the preamble sequence when transmitting the pre-indication information, and notify the terminal of the configuration through pre-indication information.

In addition, for transmitting an uplink signal, the terminal may transmit the uplink signal periodically; or the terminal may transmit the uplink signal after receiving the pre-indication information, and the pre-indication information carries an ID of the terminal and/or an ID of a terminal group where the terminal is located; or the terminal may transmit the uplink signal in a case that the pre-indication information indicates that the terminal is to be paged.

Step 103 includes: monitoring a paging of the terminal by the network-side device.

In monitoring the paging of the terminal by the network-side device, the terminal may receive a paging message transmitted by the network-side device, or may receive physical downlink control channel (PDCCH) information transmitted by the network-side device in a case that downlink information transmitted by the network-side device only contains the PDCCH information, and the PDCCH information implicitly indicates the paging to the terminal by the network-side device. In such manner, the paging of the terminal is implicitly indicated by the PDCCH information, which can avoid transmitting an additional paging message for paging, thereby saving resources and power consumption of a terminal.

The paging method according to the embodiment of the present disclosure includes: receiving pre-indication information transmitted by a network-side device; transmitting an uplink signal to the network-side device in response to the pre-indication information indicating that the terminal is to be paged; and monitoring a paging of the terminal by the network-side device, thereby achieving a feedback-based paging method. In such manner, a terminal and/or a terminal group to be paged can be indicated by the pre-indication information before paging, and after the terminal receives the pre-indication information and provides feedback, the network side can determine a paging range based on the feedback from the terminal, thus the network side does not need to perform paging in all the original tracking area, and network resources are saved. Moreover, the network side can further determine a resource location of paging based on a resource indicated by the feedback from the terminal, thereby saving beam resources for the network side to page.

In an embodiment of the present disclosure, the uplink signal transmitted by the terminal may implicitly or explicitly carry at least one of a terminal ID of the terminal or a terminal group ID of the terminal. Specifically, in a case that the uplink signal implicitly carries at least one of the terminal ID of the terminal or the terminal group ID of the terminal, at least one of the terminal ID of the terminal or the terminal group ID of the terminal is determined based on at least one of a preamble sequence, information about a beam, a time-domain resource or a frequency-domain resource that is used by the uplink signal; or in a case that the uplink signal explicitly carries at least one of the terminal ID of the terminal or the terminal group ID of the terminal, the uplink signal directly carries at least one of the terminal ID of the terminal or the terminal group ID of the terminal.

It should be noted that the terminal ID carried in the uplink signal may be complete identification information UE_ID of the terminal or a part of the UE_ID, and the UE_ID includes at least one of the following information: an international mobile subscriber identification number (IMSI), a system architecture evolution temporary mobile station identifier (S-TMSI), a temporary mobile subscriber identity (TMSI), a packet temporary mobile subscriber identity (P-TMSI), a configured ID, or a resume ID.

In an embodiment of the present disclosure, in transmitting the uplink signal to the network-side device, the terminal may transmit the uplink signal according to a variety of different resources. The resource may be at least one of a time-domain resource, a frequency-domain resource, or a beam resource. Specifically, step 102 may include:

transmitting, by the terminal, the uplink signal to the network-side device according to a reserved resource or a predefined resource, where the reserved resource is, for example, a resource reserved for the terminal in advance, and the predefined resource is, for example, a resource predefined through a technical specification; or transmitting, by the terminal, the uplink signal to the network-side device according to a resource indicated implicitly or explicitly in the pre-indication information, where in a case that the pre-indication information explicitly indicates the resource, the pre-indication information may directly carry indication information indicating a resource where the terminal is to transmit the uplink signal, or in a case that the pre-indication information implicitly indicates the resource, the resource implicitly indicated by the pre-indication information may be a time-domain resource, and/or a frequency-domain resource, and/or a beam resource corresponding to a resource, which is used by the pre-indication information; or transmitting, by the terminal, the uplink signal to the network-side device according to a resource indicated by downlink control information corresponding to the pre-indication information; or transmitting, by the terminal, the uplink signal to the network-side device according to an uplink resource corresponding to a predetermined synchronization signal block (SSB), where the predetermined SSB may be one of following SSBs: a current optimal SSB, an SSB whose signal quality is higher than a predetermined threshold, an SSB closest to the pre-indication information than other SSBs, or an SSB that is closest to the pre-indication information and has a signal quality higher than a predetermined threshold; or transmitting, by the terminal, the uplink signal to the network-side device according to a configured random access resource; or transmitting, by the terminal, the uplink signal to the network-side device according to a resource corresponding to at least one of the terminal ID of the terminal or the terminal group ID of the terminal.

Further, in an embodiment of the present disclosure, the uplink signal may carry indication information that is used to indicate a resource where the network-side device is to page, and/or indication information that is used to indicate a resource where the terminal monitors the paging from the network-side device.

In an embodiment of the present disclosure, when the terminal monitors the paging from the network-side device, the terminal may monitor it on a variety of different resources. It should be noted that the resources herein mainly refer to beam resources, and a location of a time-domain resource may be calculated based on PO and PF. Specifically, step 103 may include:

monitoring, by the terminal, the paging of the terminal by the network-side device on a resource indicated by indication information carried in the uplink signal; or monitoring, by the terminal, the paging of the terminal by the network-side device on a resource associated with a resource where the uplink signal is transmitted; or monitoring, by the terminal, the paging of the terminal by the network-side device on a configured resource; or monitoring, by the terminal, the paging of the terminal by the network-side device on a resource corresponding to at least one of a terminal identifier (ID) of the terminal or a terminal group ID of the terminal.

Figure 2:
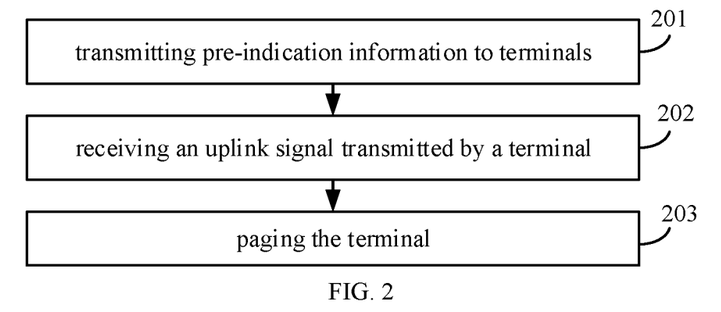
FIG. 2 is a flowchart of a paging method according to another embodiment of the present disclosure.

Reference is made to FIG. 2, and a paging method is further provided according to an embodiment of the present disclosure, which is applied to a network-side device and includes the following steps:

step 201: transmitting pre-indication information to terminals;

step 202: receiving an uplink signal transmitted by a terminal, where the terminal is at least one of a to-be-paged terminal indicated by the pre-indication information, or a terminal in a terminal group indicated by the pre-indication information; and step 203: paging the terminal.

The paging method according to the embodiment of the present disclosure includes: transmitting pre-indication information to terminals; receiving an uplink signal transmitted by a terminal, where the terminal is a to-be-paged terminal and/or a terminal in a terminal group indicated by the pre-indication information; and paging the terminal, thereby achieving a feedback-based paging method. In such manner, a terminal and/or a terminal group to be paged can be indicated by the pre-indication information before paging, and after the terminal receives the pre-indication information and provides feedback, a network side can determine a paging range based on the feedback from the terminal, thus the network side does not need to perform paging in all the original tracking area, and network resources are saved. Moreover, the network side can further determine a resource location of paging based on a resource indicated by the feedback from the terminal, thereby saving beam resources for paging of a network side.

In an embodiment of the present disclosure, step 203 may include:

transmitting a paging message to the terminal; or transmitting PDCCH information to the terminal, where the PDCCH information implicitly indicates the paging of the terminal.

Optionally, the pre-indication information includes at least one of following information: paging indication information, prior indication information, a wake-up signaling, or a go-to-sleep signaling.

Optionally, the uplink signal includes at least one of following signals: a sequence signal, a predefined indication signal, an uplink reference signal, an uplink signal carried in a physical uplink control channel, or an uplink signal carried in a physical uplink sharing channel.

Specifically, the uplink signal may be a preamble sequence signal, and a preamble sequence corresponding to the preamble sequence signal is configured by the network-side device for the terminal through system information and/or a dedicated radio resource control (RRC) signaling.

In an embodiment of the present disclosure, the uplink signal implicitly or explicitly carries at least one of a terminal identifier (ID) of the terminal or an ID of the terminal group to which the terminal belongs.

Further, in a case that the uplink signal implicitly carries at least one of the terminal ID of the terminal or the ID of the terminal group to which the terminal belongs, at least one of the terminal ID of the terminal or the ID of the terminal group to which the terminal belongs is determined based on at least one of a preamble sequence, information about a beam, a time-domain resource or a frequency-domain resource that is used by the uplink signal; or in a case that the uplink signal explicitly carries at least one of the terminal ID of the terminal or the ID of the terminal group to which the terminal belongs, the uplink signal directly carries at least one of the terminal ID of the terminal or the ID of the terminal group to which the terminal belongs.

Optionally, the terminal ID includes complete identification information UE_ID of the terminal or a part of the UE_ID, and the UE_ID includes at least one of following information: IMSI, S-TMSI, TMSI, P-TMSI, a configured ID, or a resume ID.

In an embodiment of the present disclosure, step 202 may include:

receiving the uplink signal transmitted by the terminal according to a reserved resource or a predefined resource; or receiving the uplink signal transmitted by the terminal according to a resource indicated implicitly or explicitly in the pre-indication information; or receiving the uplink signal transmitted by the terminal according to a resource indicated in downlink control information corresponding to the pre-indication information; or receiving the uplink signal transmitted by the terminal according to an uplink resource corresponding to a predetermined synchronization signal block (SSB); or receiving the uplink signal transmitted by the terminal according to a configured random access resource; or receiving the uplink signal transmitted by the terminal according to a resource corresponding to at least one of the terminal ID of the terminal or the ID of the terminal group to which the terminal belongs.

Optionally, in a case that the pre-indication information explicitly indicates the resource, the pre-indication information carries indication information for indicating a resource where a terminal is to transmit the uplink signal; and in a case that the pre-indication information implicitly indicates the resource, the resource implicitly indicated by the pre-indication information is a resource corresponding to a resource used by the pre-indication information.

Optionally, the predetermined SSB includes one of the following SSBs: a current optimal SSB, an SSB whose signal quality is higher than a predetermined threshold, an SSB closest to the pre-indication information, or an SSB that is closest to the pre-indication information and has a signal quality higher than a predetermined threshold.

Optionally, the resource includes at least one of a time-domain resource, a frequency-domain resource, or a beam resource.

In an embodiment of the present disclosure, the uplink signal carries indication information that is used to indicate a resource where the network-side device is to page, and/or indication information that is used to indicate a resource where the terminal monitors the paging from the network-side device.

In the embodiment of the present disclosure, step 203 may include:

paging the terminal on a resource indicated by indication information carried in the uplink signal; or paging the terminal on a resource associated with a resource where the uplink signal is received; or paging the terminal on a configured resource; or paging the terminal on a resource corresponding to at least one of a terminal identifier (ID) of the terminal or an ID of a terminal group to which the terminal belongs; or paging the terminal on all or part of downlink beams based on beam sweeping.

Optionally, the resource includes a beam resource.

The paging method of the present disclosure are described in the above embodiments, and a terminal and a network-side device corresponding to the paging method of the present disclosure will be described below in combination with embodiments and the accompanying drawings.

Figure 3:
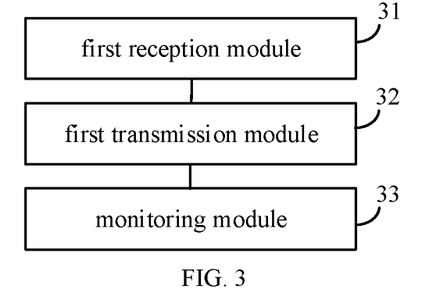
FIG. 3 is a schematic structural diagram of a terminal according to an embodiment of the present disclosure.

Referring to FIG. 3, a terminal is further provided according to an embodiment of the present disclosure. The terminal includes a first reception module 31, a first transmission module 32 and a monitoring module 33.

The first reception module 31 is configured to receive pre-indication information transmitted by a network-side device.

The first transmission module 32 is configured to transmit an uplink signal to the network-side device when the pre-indication information indicates that the terminal is to be paged.

The monitoring module 33 is configured to monitor a paging of the terminal by the network-side device.

The terminal in the embodiment of the present disclosure can achieve a feedback-based paging method by receiving pre-indication information transmitted by a network-side device, transmitting an uplink signal to the network-side device in response to the pre-indication information indicating that the terminal is to be paged, and monitoring a paging of the terminal by the network-side device. In such manner, a terminal and/or a terminal group to be paged can be indicated by the pre-indication information before paging, and after the terminal receives the pre-indication information and provides feedback, the network side can determine a paging range based on the feedback from the terminal, thus the network side does not need to perform paging in all the original tracking area, and network resources are saved. Moreover, the network side can further determine a resource location of paging based on a resource indicated by the feedback from the terminal, thereby saving beam resources for the network side to page.

In an embodiment of the present disclosure, the monitoring module 33 is specifically configured to:

receive a paging message transmitted by the network-side device; or receive physical downlink control channel (PDCCH) information transmitted by the network-side device, where the PDCCH information implicitly indicates the paging of the terminal.

Optionally, the pre-indication information includes at least one of following information: paging indication information, prior indication information, a wake-up signaling, or a go-to-sleep signaling.

Optionally, the uplink signal includes at least one of following signals: a sequence signal, a predefined indication signal, an uplink reference signal, an uplink signal carried in a physical uplink control channel, or an uplink signal carried in a physical uplink sharing channel.

Optionally, the uplink signal is a preamble sequence signal, and a preamble sequence corresponding to the preamble sequence signal is configured for the terminal by the network-side device through at least one of system information or a dedicated radio resource control (RRC) signaling.

In an embodiment of the present disclosure, the uplink signal implicitly or explicitly carries at least one of a terminal identifier (ID) of the terminal or a terminal group ID of the terminal.

Optionally, in a case that the uplink signal implicitly carries at least one of the terminal ID of the terminal or the terminal group ID of the terminal, at least one of the terminal ID of the terminal or the terminal group ID of the terminal is determined based on at least one of a preamble sequence, information about a beam, a time-domain resource or a frequency-domain resource that is used by the uplink signal; or in a case that the uplink signal explicitly carries at least one of the terminal ID of the terminal or the terminal group ID of the terminal, the uplink signal directly carries at least one of the terminal ID of the terminal or the terminal group ID of the terminal.

Optionally, the terminal ID includes complete identification information UE_ID of the terminal or a part of the UE_ID, and the UE_ID includes at least one of following information: IMSI, S-TMSI, TMSI, P-TMSI, a configured ID, or a resume ID.

In an embodiment of the present disclosure, the first transmission module 32 is specifically configured to:

transmit the uplink signal to the network-side device according to a reserved resource or a predefined resource; or transmit the uplink signal to the network-side device according to a resource indicated implicitly or explicitly in the pre-indication information; or transmit the uplink signal to the network-side device according to a resource indicated in downlink control information corresponding to the pre-indication information; or transmit the uplink signal to the network-side device according to an uplink resource corresponding to a predetermined synchronization signal block (SSB); or transmit the uplink signal to the network-side device according to a configured random access resource; or transmit the uplink signal to the network-side device according to a resource corresponding to at least one of the terminal ID of the terminal or the terminal group ID of the terminal.

Optionally, in a case that the pre-indication information explicitly indicates the resource, the pre-indication information carries indication information for indicating a resource where a terminal is to transmit the uplink signal; and in a case that the pre-indication information implicitly indicates the resource, the resource implicitly indicated by the pre-indication information includes a resource corresponding to a resource used by the pre-indication information.

Optionally, the predetermined SSB includes one of following SSBs: a current optimal SSB, an SSB whose signal quality is higher than a predetermined threshold, an SSB closest to the pre-indication information, or an SSB that is closest to the pre-indication information and has a signal quality higher than a predetermined threshold.

Optionally, the resource includes at least one of a time-domain resource, a frequency-domain resource, or a beam resource.

In an embodiment of the present disclosure, the uplink signal carries indication information that is used to indicate a resource for the network-side device to page, and/or indication information that is used to indicate a resource where the terminal monitors the paging from the network-side device.

In an embodiment of the present disclosure, the monitoring module 33 is specifically configured to:

monitor the paging of the terminal by the network-side device on a resource indicated by indication information carried in the uplink signal; or monitor the paging of the terminal by the network-side device on a resource associated with a resource where the uplink signal is transmitted; or monitor the paging of the terminal by the network-side device on a configured resource; or monitor the paging of the terminal by the network-side device on a resource corresponding to at least one of a terminal identifier (ID) of the terminal or a terminal group ID of the terminal.

Optionally, the resource includes a beam resource.

Figure 4:
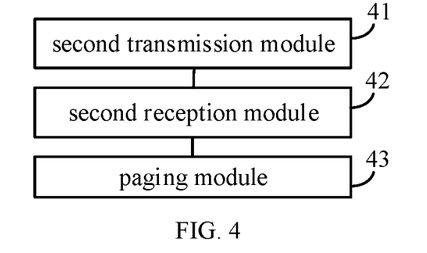
FIG. 4 is a schematic structural diagram of a network-side device according to an embodiment of the present disclosure.

Referring to FIG. 4, a network-side device is further provided according to an embodiment of the present disclosure. The network-side device includes a second transmission module 41, a second reception module 42, and a paging module 43.

The second transmission module 41 is configured to transmit pre-indication information to terminals;

The second reception module 42 is configured to receive an uplink signal transmitted by a terminal, where the terminal is a to-be-paged terminal indicated by the pre-indication information, and/or a terminal in a terminal group indicated by the pre-indication information.

The paging module 43 is configured to page the terminal.

The network-side device according to the embodiments of the present disclosure can achieve a feedback-based paging method by transmitting pre-indication information to terminals; receiving an uplink signal transmitted by a terminal, where the terminal is at least one of a to-be-paged terminal indicated by the pre-indication information, or a terminal in a terminal group indicated by the pre-indication information; and paging the terminal. In such manner, a terminal and/or a terminal group to be paged can be indicated by the pre-indication information before paging, and after the terminal receives the pre-indication information and provides feedback, the network side can determine a paging range based on the feedback from the terminal, thus the network side does not need to perform paging in all the original tracking area, and network resources are saved. Moreover, the network side can further determine a resource location of paging based on a resource indicated by the feedback from the terminal, thereby saving beam resources for the network side to page.

In an embodiment of the present disclosure, the paging module 43 is specifically configured to:

transmit a paging message to the terminal; or transmit physical downlink control channel (PDCCH) information to the terminal, where the PDCCH information implicitly indicates the paging of the terminal.

Optionally, the pre-indication information includes at least one of following information: paging indication information, prior indication information, a wake-up signaling, or a go-to-sleep signaling.

Optionally, the uplink signal includes at least one of following signals: a sequence signal, a predefined indication signal, an uplink reference signal, an uplink signal carried in a physical uplink control channel, or an uplink signal carried in a physical uplink sharing channel.

Optionally, the uplink signal is a preamble sequence signal, and a preamble sequence corresponding to the preamble sequence signal is configured by the network-side device for the terminal through at least one of system information or a dedicated radio resource control (RRC) signaling.

In the embodiment of the present disclosure, the uplink signal implicitly or explicitly carries at least one of a terminal identifier (ID) of the terminal or a terminal group ID of the terminal.

Optionally, in a case that the uplink signal implicitly carries at least one of the terminal ID of the terminal or the terminal group ID of the terminal, at least one of the terminal ID of the terminal or the terminal group ID of the terminal is determined based on at least one of a preamble sequence, information about a beam, a time-domain resource or a frequency-domain resource that is used by the uplink signal; or in a case that the uplink signal explicitly carries at least one of the terminal ID of the terminal or the terminal group ID of the terminal, the uplink signal directly carries at least one of the terminal ID of the terminal or the terminal group ID of the terminal.

Optionally, the terminal ID includes complete identification information UE_ID of the terminal or a part of the UE_ID, and the UE_ID includes at least one of following information: IMSI, S-TMSI, TMSI, P-TMSI, a configured ID, or a resume ID.

In an embodiment of the present disclosure, the second reception module 42 is specifically configured to:

receive the uplink signal transmitted by the terminal according to a reserved resource or a predefined resource; or receive the uplink signal transmitted by the terminal according to a resource indicated implicitly or explicitly in the pre-indication information; or receive the uplink signal transmitted by the terminal according to a resource indicated in downlink control information corresponding to the pre-indication information; or receive the uplink signal transmitted by the terminal according to an uplink resource corresponding to a predetermined synchronization signal block (SSB); or receive the uplink signal transmitted by the terminal according to a configured random access resource; or receive the uplink signal transmitted by the terminal according to a resource corresponding to at least one of the terminal ID of the terminal or the terminal group ID of the terminal.

Optionally, in a case that the pre-indication information explicitly indicates the resource, the pre-indication information carries indication information for indicating a resource where a terminal is to transmit the uplink signal; and in a case that the pre-indication information implicitly indicates the resource, the resource implicitly indicated by the pre-indication information includes a resource corresponding to a resource used by the pre-indication information.

Optionally, the predetermined SSB includes one of following SSBs: a current optimal SSB, an SSB whose signal quality is higher than a predetermined threshold, an SSB closest to the pre-indication information, or an SSB that is closest to the pre-indication information and has a signal quality higher than a predetermined threshold.

Optionally, the resource includes at least one of a time-domain resource, a frequency-domain resource, or a beam resource.

In an embodiment of the present disclosure, the uplink signal carries indication information that is used to indicate a resource for the network-side device to page, and/or indication information that is used to indicate a resource where the terminal monitors a paging from the network-side device.

In an embodiment of the present disclosure, the paging module 43 is specifically configured to:

page the terminal on a resource indicated by indication information carried in the uplink signal; or page the terminal on a resource associated with a resource where the uplink signal is received; or page the terminal on a configured resource; or page the terminal on a resource corresponding to at least one of a terminal identifier (ID) of the terminal or a terminal group ID of the terminal; or page the terminal on all or part of downlink beams based on beam sweeping.

Optionally, the resource includes a beam resource.

In addition, embodiments of the present disclosure further provide a terminal, including a processor, a memory, and a computer program stored on the memory and executable on the processor. When executing the computer program, the processor is configured to perform various processes in the above embodiments about the paging method applied to the terminal, and the same technical effects can be achieved. To avoid repetition, details are not described herein again.

Figure 5:
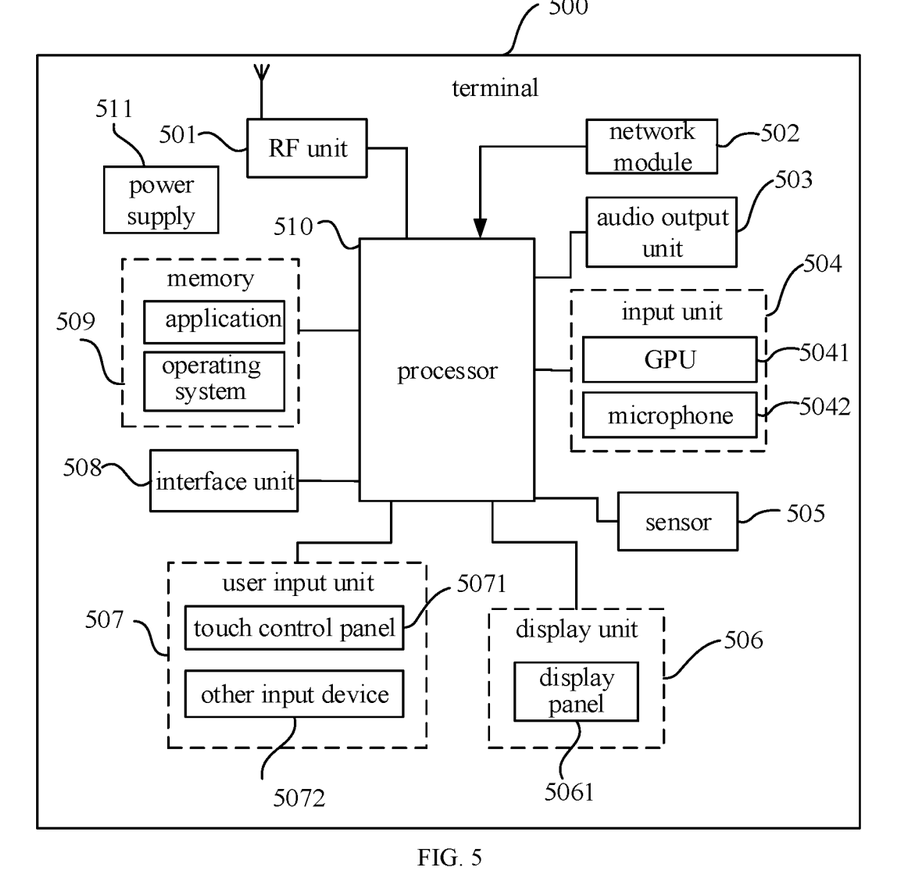
FIG. 5 is a schematic structural diagram of a terminal according to another embodiment of the present disclosure.

Specifically, FIG. 5 is a schematic diagram of a hardware structure of a terminal implementing various embodiments of the present disclosure. The terminal 500 includes, but not limited to, a radio frequency (RF) unit 501, a network module 502, an audio output unit 503, an input unit 504, a sensor 505, a display unit 506, a user input unit 507, an interface unit 508, a memory 509, a processor 510 and a power supply 511. Those skilled in the art can understand that the terminal structure shown in FIG. 5 does not constitute a limitation to the terminal, and the terminal may include more or fewer components than the components shown in FIG. 5, or some components may be combined, or some components may be arranged in different manner from an arrangement manner shown in FIG. 5. In an embodiment of the present disclosure, the terminal includes, but not limited to, a mobile phone, a tablet computer, a notebook computer, a palmtop computer, a vehicle-mounted terminal, a wearable device, a pedometer.

The RF unit 501 is configured to receive pre-indication information transmitted by a network-side device, and transmit an uplink signal to the network-side device in a case that the pre-indication information indicates that the terminal is to be paged.

The processor 510 is configured to monitor a paging of the terminal by the network-side device.

The terminal 500 in the embodiment of the present disclosure can achieve a feedback-based paging method by receiving pre-indication information transmitted by a network-side device, transmitting an uplink signal to the network-side device in response to the pre-indication information indicating that the terminal is to be paged, and monitoring a paging of the terminal by the network-side device. In such manner, a terminal and/or a terminal group to be paged can be indicated by the pre-indication information before paging, and after the terminal receives the pre-indication information and provides feedback, the network side can determine a paging range based on the feedback from the terminal, thus the network side does not need to perform paging in all the original tracking area, and network resources are saved. Moreover, the network side can further determine a resource location of paging based on a resource indicated by the feedback from the terminal, thereby saving beam resources for the network side to page.

Understandably, in an embodiment of the present disclosure, the RF circuit 501 may be configured to receive and send information, or to receive and send signals in a call. Specifically, the RF circuit delivers the downlink information received from a base station to the processor 510 for processing, and transmits uplink data to the base station. Generally, the RF circuit 501 includes, but not limited to, an antenna, at least one amplifier, a transceiver, a coupler, a low noise amplifier, and a duplexer. In addition, the RF circuit 501 may communicate with other devices via wireless communication or network.

The terminal provides users with wireless broadband Internet access through the network module 502, such as assisting users to transmit and receive email, browse web pages, and access streaming media.

The audio output unit 503 may convert audio data received by the RF unit 505 or the network module 502 or stored in the memory 509 into an audio signal and output the audio signal as sound. Moreover, the audio output unit 503 may provide audio outputs (for example, a call signal reception sound, a message reception sound, etc.) related to specific functions performed by the terminal 500. The audio output unit 503 includes a speaker, a buzzer, a receiver, and the like.

The input unit 504 is configured to receive audio or video signals. The input unit 504 may include a graphics processing unit (GPU) 5041 and a microphone 5042. The GPU 5041 is configured to process static images or image data of a video obtained by an image capture device (such as a camera) in an image capture mode or a video capture mode, and processed image frames may be displayed on the display unit 506. The image frames processed by the GPU 5041 may be stored in the memory 509 (or other storage medium), or transmitted by the RF unit 501 or the network module 502. The microphone 5042 may be configured to receive a sound, and process such sound into audio data. The processed audio data can be converted into a format that can be transmitted to a mobile communication base station via the RF unit 501 for outputting in the case of a telephone call mode.

The terminal 500 may further include at least one sensor 505, such as an optical sensor, a motion sensor and other sensors. The optical sensor may include an ambient light sensor and a proximity sensor. The ambient light sensor may adjust the luminance of the display panel 5061 according to the intensity of ambient light, and the proximity sensor may close backlight of the display panel 5061 or the display panel 5061 when the mobile phone is approaching to the ear. As a kind of motion sensor, an acceleration sensor may detect the magnitude of acceleration in multiple directions (usually three-axis directions) and detect the value and direction of the gravity when the sensor is in the stationary state. The acceleration sensor may be applied in, for example, an application of terminal pose recognition (for example, switching between a landscape screen and a portrait screen, a correlated game, and magnetometer pose calibration), a function about vibration recognition (for example, a pedometer, and knocking). The sensor 105 may further include a fingerprint sensor, a pressure sensor, an iris sensor, a molecular sensor, a gyroscope, a barometer, a hygrometer, a thermometer, and an infrared sensor, which are not described herein.

The display unit 506 is configured to display information inputted by users or information provided to users. The display unit 506 may include a display panel 5061, which may be configured in a form of a liquid crystal display (LCD), an organic light-emitting diode (OLED), or the like.

The user input unit 507 may be configured to receive input numeric or character information, and to generate a key signal input related to user setting and function control of the terminal. Specifically, the user input unit 507 may include a touch control panel 5071 and other input device 5072. The touch control panel 5071 is also referred to as a touch screen which may collect a touch operation thereon or thereby (for example, an operation on or around the touch control panel 5071 that is made by a user with a finger, a touch pen and any other suitable object or accessory), Optionally, the touch control panel 5071 may include a touch detection device and a touch controller. The touch detection device detects touch orientation of a user, detects a signal generated by the touch operation, and transmits the signal to the touch controller. The touch controller receives touch information from the touch detection device, converts the touch information into touch coordinates and transmits the touch coordinates to the processor 510. The touch controller can also receive a command from the processor 510 and execute the command. In addition, the touch control panel 5071 may be implemented by, for example, a resistive panel, a capacitive panel, an infrared panel and a surface acoustic wave panel. In addition to the touch control panel 5071, the user input unit 507 may also include other input device 5072. Specifically, the other input device 5072 may include but not limited to one or more of: a physical keyboard, a function key (such as a volume control button, a switch button), a trackball, a mouse or a joystick, which are not described herein.

In addition, the display panel 5061 may be covered by the touch control panel 5071. When the touch control panel 5071 detects a touch operation thereon or thereby, the touch control panel 5071 transmits the touch operation to the processor 510 to determine the type of the touch event, and then the processor 510 provides a corresponding visual output on the display panel 5061 according to the type of the touch event. Although the touch control panel 5071 and the display panel 5061 implement the input and output functions of the terminal as two separate components as shown in FIG. 5, the touch control panel 5071 and the display panel 5061 may be integrated together to implement the input and output functions of the terminal in other embodiments, which are not described herein.

The interface unit 508 is an interface for connecting an external device to the terminal 500. For example, the external device may include a wired or wireless headset port, an external power (or battery charger) port, a wired or wireless data port, a memory card port, a port for connecting a device with an identification module, an audio input/output (I/O) port, a video I/O port, an earphone port, and the like. The interface unit 508 may be configured to receive input (for example, data information, power, etc.) from an external device and transmit the received input to one or more components in the terminal 500, or may be configured to transmit data between the terminal 500 and an external device.

The memory 509 may be configured to store software programs and various data. The memory 509 may mainly include a program storing region and a data storing region, where the program storing region may store an operating system, an application program which is needed by at least one function (such as an audio playing function and an image playing function); and the data storing region may store data established based on use of a mobile phone (such as audio data and a phone book). In addition, the memory 509 may include a high speed random access memory, and may also include a non-volatile memory such as at least one magnetic disk storage device or a flash memory, or other volatile solid-state memory.

The processor 510 is a control center of the mobile phone, which connects various parts of the terminal by using various interfaces and wires, and implements various functions and data processing of the terminal by running or executing the software programs and/or modules stored in the memory 509 and invoking data stored in the memory 509, thereby monitoring the mobile phone as a whole. Optionally, the processor 510 may include one or more processing cores. Optionally, an application processor and a modem processor may be integrated into the processor 510. The application processor is mainly configured to process, for example, an operating system, a user interface and an application. The modem processor is mainly configured to process wireless communication. It can be understood that the above modem processor may not be integrated into the processor 510.

The terminal 500 may further includes the power supply 511 (such as a battery) for powering various components. Optionally, the power supply may be logically connected with the processor 510 via a power management system, therefore, functions such as charging, discharging and power management are implemented by the power management system.

Moreover, the terminal 500 may further include some functional modules that are not shown, and details are not described herein.

A network-side device is further provided according to embodiments of the present disclosure, which includes a processor, a memory, and a computer program stored on the memory and executable on the processor. The computer program is executed by the processor to perform various processes in the above embodiments about the paging method applied to the network-side device, and the same technical effects can be achieved. To avoid repetition, details are not described herein again.

Figure 6:
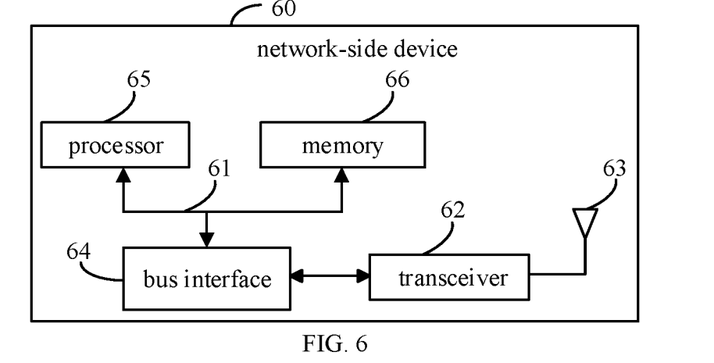
FIG. 6 is a schematic structural diagram of a network-side device according to another embodiment of the present disclosure.

Specifically, FIG. 6 is a schematic diagram of a hardware structure of a network-side device that implements various embodiments of the present disclosure. The network-side device 60 includes, but not limited to, a bus 61, a transceiver 62, an antenna 63, a bus interface 64, a processor 65 and a memory 66.

In an embodiment of the present disclosure, the network-side device 60 further includes a computer program stored on the memory 66 and executable on the processor 65. When executing the computer program, the processor 65 is configured to implement the following steps:

controlling the transceiver 62 to transmit pre-indication information to terminals, receive an uplink signal transmitted by a terminal, where the terminal is a to-be-paged terminal and/or a terminal in a terminal group indicated by the pre-indication information, and page the terminal.

The transceiver 62 is configured to receive and transmit data under the control of the processor 65.

In FIG. 6, the bus architecture is represented by the bus 61. The bus 61 may include any number of interconnected buses and bridges. The bus 61 may link various circuits together, which include one or more processors represented by the processor 65 and memories represented by the memory 66. The bus 61 may also link other circuits such as external equipment, a voltage stabilizer and a power management circuit, which is common knowledge in the art and therefore is not described in further detail in the present disclosure. The bus interface 64 is configured to provide an interface. The transceiver 62 may include multiple components, for example, including multiple receivers and transmitters, which provides units for communication with other apparatuses on a transmission medium. The data processed by the processor 65 is transmitted on a wireless medium through the antenna 63, and the antenna 63 also receives data and transmits the data to the processor 65.

The processor 65 is responsible for managing the bus 61 and general processing, and may also provide various functions, which includes timing, peripheral interfaces, voltage regulation, power management, and other control functions. The memory 66 may be configured to store data used by the processor 65 when performing operations.

Optionally, the processor 65 may be a central processing unit (CPU), an application specific integrated circuit (ASIC), a field programmable gate array (FPGA), or a complex programmable logic device (CPLD).

A computer-readable storage medium is further provided according to embodiments of the present disclosure. The computer-readable storage medium stores a computer program, and the computer program is executed by a processor to implement various processes in the above embodiments about the paging method applied to a terminal, the same technical effects can be achieved, and details are not described herein again to avoid repetition. The computer-readable storage medium is, for example, a read-only memory (ROM), a random access memory (RAM), a magnetic disk, or an optical disk.

A computer-readable storage medium is further provided according to embodiments of the present disclosure, on which a computer program is stored. The computer-readable storage medium stores a computer program, and the computer program is executed by a processor to implement various processes in the above embodiments about the paging method applied to a network-side device, the same technical effects can be achieved, and details are not described herein again to avoid repetition. The computer-readable storage medium is, for example, a read-only memory (ROM), a random access memory (RAM), a magnetic disk, or an optical disk.

It should be noted that, terms "include" and "comprise" and any variant thereof in this specification are intended to cover nonexclusive inclusions. That is, a process, method, article or equipment including a series of elements is not limited to those elements, but may include other elements which are not clearly listed or intrinsic to the process, method, article or equipment. Without more restrictions, an element limited by the sentence "including a . . . " does not exclude other identical elements existing in the process, method, article, or device that includes the element.

Those skilled in the art can clearly understand, from the description of the above embodiments, that the methods in the above embodiments can be implemented by means of software and a necessary universal hardware platform, or of course, by means of hardware, and the former is better in many cases. Based on such an understanding, essential part or the part contributing to the relevant art of the technical solutions of the present disclosure may be implemented in a form of a software product. The software product is stored in a storage medium (such as ROM, RAM, magnetic disk, or optical disk), and includes several instructions for instructing a computer device (which may be a mobile phone, a computer, an air conditioner, a server, or a network device) to perform the methods described in various embodiments of the present disclosure.

The embodiments of the present disclosure have been described above with reference to the accompanying drawings, but the present disclosure is not limited to the specific implementations described above, which are only schematic and not restrictive. Those of ordinary skill in the art can make many transformations under the inspiration of the present disclosure and without departing from the principle of the present disclosure and the protection scope of the claims, which shall all fall within the protection of the present disclosure.

What is claimed is:

1. A paging method, applied to a terminal, and comprising:
    receiving pre-indication information transmitted by a network-side device;
    transmitting an uplink signal to the network-side device in a case that the pre-indication information indicates that the terminal is to be paged; and
    monitoring a paging of the terminal by the network-side device,
    wherein the transmitting the uplink signal to the network-side device comprises:
        transmitting the uplink signal to the network-side device on a reserved resource or a predefined resource; or
        transmitting the uplink signal to the network-side device on a resource indicated implicitly or explicitly in the pre-indication information; or
        transmitting the uplink signal to the network-side device on a resource indicated in downlink control information corresponding to the pre-indication information; or
        transmitting the uplink signal to the network-side device on an uplink resource corresponding to a predetermined synchronization signal block (SSB); or
        transmitting the uplink signal to the network-side device on a configured random access resource; or
        transmitting the uplink signal to the network-side device on a resource corresponding to at least one of a terminal ID of the terminal or an ID of a terminal group to which the terminal belongs,
    wherein the uplink signal comprises at least one of following signals: an uplink reference signal, an uplink signal carried in a physical uplink control channel, or an uplink signal carried in a physical uplink sharing channel,
    wherein in a case that the pre-indication information explicitly indicates a resource, the pre-indication information carries indication information for indicating a resource where a terminal is to transmit the uplink signal; and in a case that the pre-indication information implicitly indicates a resource, the resource implicitly indicated by the pre-indication information comprises a resource corresponding to a resource used by the pre-indication information; or,
    wherein the predetermined SSB comprises one of following SSBs: a current optimal SSB, an SSB whose signal quality is higher than a predetermined threshold, an SSB closest to the pre-indication information, or an SSB that is closest to the pre-indication information and has a signal quality higher than a predetermined threshold; or,
    wherein the uplink signal carries indication information that is used to indicate a resource for the network-side device to page, and/or indication information that is used to indicate a resource where the terminal monitors the paging from the network-side device.

2. The paging method according to claim 1, wherein the uplink signal further comprises at least one of following signals: a sequence signal, or a predefined indication signal.

3. The paging method according to claim 1, wherein the monitoring the paging of the terminal by the network-side device comprises:
    monitoring the paging of the terminal by the network-side device on a resource indicated by indication information carried in the uplink signal; or
    monitoring the paging of the terminal by the network-side device on a resource associated with a resource where the uplink signal is transmitted; or
    monitoring the paging of the terminal by the network-side device on a configured resource; or
    monitoring the paging of the terminal by the network-side device on a resource corresponding to at least one of a terminal identifier (ID) of the terminal or an ID of a terminal group to which the terminal belongs.

4. A terminal, comprising: a processor, a memory and a computer program that is stored on the memory and is executable on the processor, wherein when executing the computer program, the processor is configured to: perform steps of the paging method according to claim 1.

5. The terminal according to claim 4, wherein the uplink signal implicitly or explicitly carries at least one of a terminal identifier (ID) of the terminal or an ID of a terminal group to which the terminal belongs.

6. The terminal according to claim 5, wherein, in a case that the uplink signal implicitly carries at least one of the terminal ID of the terminal or the ID of the terminal group to which the terminal belongs, at least one of the terminal ID of the terminal or the ID of the terminal group to which the terminal belongs is determined based on at least one of a preamble sequence, information about a beam, a time-domain resource or a frequency-domain resource that is used by the uplink signal; or
    in a case that the uplink signal explicitly carries at least one of the terminal ID of the terminal or the ID of the terminal group to which the terminal belongs, the uplink signal directly carries at least one of the terminal ID of the terminal or the ID of the terminal group to which the terminal belongs.

7. The terminal according to claim 4, wherein the uplink signal further comprises at least one of following signals: a sequence signal, or a predefined indication signal.

8. The terminal according to claim 4, wherein, the monitoring the paging of the terminal by the network-side device comprises:
    monitoring the paging of the terminal by the network-side device on a resource indicated by indication information carried in the uplink signal; or
    monitoring the paging of the terminal by the network-side device on a resource associated with a resource where the uplink signal is transmitted; or monitoring the paging of the terminal by the network-side device on a configured resource; or monitoring the paging of the terminal by the network-side device on a resource corresponding to at least one of a terminal identifier (ID) of the terminal or an ID of a terminal group to which the terminal belongs.

9. The paging method according to claim 1, wherein the uplink signal implicitly or explicitly carries at least one of a terminal identifier (ID) of the terminal or an ID of a terminal group to which the terminal belongs.

10. The paging method according to claim 9, wherein in a case that the uplink signal implicitly carries at least one of the terminal ID of the terminal or the ID of the terminal group to which the terminal belongs, at least one of the terminal ID of the terminal or the ID of the terminal group to which the terminal belongs is determined based on at least one of a preamble sequence, information about a beam, a time-domain resource or a frequency-domain resource that is used by the uplink signal; or in a case that the uplink signal explicitly carries at least one of the terminal ID of the terminal or the ID of the terminal group to which the terminal belongs, the uplink signal directly carries at least one of the terminal ID of the terminal or the ID of the terminal group to which the terminal belongs.

11. A paging method, applied to a network-side device, and comprising:

transmitting pre-indication information to terminals;

receiving an uplink signal transmitted by a terminal, wherein the terminal is at least one of a to-be-paged terminal indicated by the pre-indication information, or a terminal in a terminal group indicated by the pre-indication information; and paging the terminal, wherein the receiving the uplink signal transmitted by the terminal comprises:

receiving the uplink signal transmitted by the terminal on a reserved resource or a predefined resource; or receiving the uplink signal transmitted by the terminal on a resource indicated implicitly or explicitly in the pre-indication information; or receiving the uplink signal transmitted by the terminal on a resource indicated in downlink control information corresponding to the pre-indication information; or receiving the uplink signal transmitted by the terminal on an uplink resource corresponding to a predetermined synchronization signal block (SSB); or receiving the uplink signal transmitted by the terminal on a configured random access resource; or receiving the uplink signal transmitted by the terminal on a resource corresponding to at least one of a terminal ID of the terminal or an ID of the terminal group to which the terminal belongs, wherein the uplink signal comprises at least one of following signals: an uplink reference signal, an uplink signal carried in a physical uplink control channel, or an uplink signal carried in a physical uplink sharing channel, wherein in a case that the pre-indication information explicitly indicates a resource, the pre-indication information carries indication information for indicating a resource where a terminal is to transmit the uplink signal; and in a case that the pre-indication information implicitly indicates a resource, the resource implicitly indicated by the pre-indication information comprises a resource corresponding to a resource used by the pre-indication information; or, wherein the predetermined SSB comprises one of following SSBs: a current optimal SSB, an SSB whose signal quality is higher than a predetermined threshold, an SSB closest to the pre-indication information, or an SSB that is closest to the pre-indication information and has a signal quality higher than a predetermined threshold; or, wherein the uplink signal carries indication information that is used to indicate a resource for the network-side device to page, and/or indication information that is used to indicate a resource where the terminal monitors the paging from the network-side device.

12. The paging method according to claim 11, wherein the uplink signal further comprises at least one of following signals: a sequence signal, or a predefined indication signal.

13. The paging method according to claim 11, wherein the paging the terminal comprises:

paging the terminal on a resource indicated by indication information carried in the uplink signal; or paging the terminal on a resource associated with a resource where the uplink signal is received; or paging the terminal on a configured resource; or paging the terminal on a resource corresponding to at least one of a terminal identifier (ID) of the terminal or an ID of the terminal group to which the terminal belongs; or paging the terminal on all or part of downlink beams based on beam sweeping.

14. A network-side device, comprising: a processor, a memory and a computer program that is stored on the memory and is executable on the processor, wherein when executing the computer program, the processor is configured to perform steps of the paging method according to claim 11.

15. The network-side device according to claim 14, wherein, the uplink signal further comprises at least one of following signals: a sequence signal, or a predefined indication signal.

16. The network-side device according to claim 14, wherein, the uplink signal implicitly or explicitly carries at least one of a terminal identifier (ID) of the terminal or an ID of the terminal group to which the terminal belongs.

17. The network-side device according to claim 16, wherein, in a case that the uplink signal implicitly carries at least one of the terminal ID of the terminal or the ID of the terminal group to which the terminal belongs, at least one of the terminal ID of the terminal or the ID of the terminal group to which the terminal belongs is determined based on at least one of a preamble sequence, information about a beam, a time-domain resource or a frequency-domain resource that is used by the uplink signal; or in a case that the uplink signal explicitly carries at least one of the terminal ID of the terminal or the ID of the terminal group to which the terminal belongs, the uplink signal directly carries at least one of the terminal ID of the terminal or the ID of the terminal group to which the terminal belongs.

18. The network side device according to claim 14, wherein, the paging the terminal comprises:

paging the terminal on a resource indicated by indication information carried in the uplink signal; or paging the terminal on a resource associated with a resource where the uplink signal is received; or paging the terminal on a configured resource; or paging the terminal on a resource corresponding to at least one of a terminal identifier (ID) of the terminal or an ID of the terminal group to which the terminal belongs; or paging the terminal on all or part of downlink beams based on beam sweeping.

19. The paging method according to claim 11, wherein the uplink signal implicitly or explicitly carries at least one of a terminal identifier (ID) of the terminal or an ID of the terminal group to which the terminal belongs.

20. The paging method according to claim 19, wherein in a case that the uplink signal implicitly carries at least one of the terminal ID of the terminal or the ID of the terminal group to which the terminal belongs, at least one of the terminal ID of the terminal or the ID of the terminal group to which the terminal belongs is determined based on at least one of a preamble sequence, information about a beam, a time-domain resource or a frequency-domain resource that is used by the uplink signal; or in a case that the uplink signal explicitly carries at least one of the terminal ID of the terminal or the ID of the terminal group to which the terminal belongs, the uplink signal directly carries at least one of the terminal ID of the terminal or the ID of the terminal group to which the terminal belongs.

* * * * *